United States Patent
Dietze et al.

(10) Patent No.: US 11,450,877 B2
(45) Date of Patent: Sep. 20, 2022

(54) TOOLING AND METHOD FOR ALIGNMENT AND ASSEMBLY OF BATTERY MODULE

(71) Applicant: GM GLOBAL TECHNOLOGY OPERATIONS LLC, Detroit, MI (US)

(72) Inventors: Robert H. Dietze, Brighton, MI (US); Christopher Brady, Madison Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 306 days.

(21) Appl. No.: 16/819,733

(22) Filed: Mar. 16, 2020

(65) Prior Publication Data

US 2021/0288344 A1 Sep. 16, 2021

(51) Int. Cl.
*H01M 10/04* (2006.01)
*H01M 50/503* (2021.01)
*H01M 50/209* (2021.01)

(52) U.S. Cl.
CPC ..... *H01M 10/0404* (2013.01); *H01M 50/209* (2021.01); *H01M 50/503* (2021.01)

(58) Field of Classification Search
CPC ......... H01M 10/04–049; H01M 10/058–0587; H01M 50/20–209; H01M 50/249; H01M 50/258–264; H01M 50/284–287; H01M 50/50–503; H01M 50/514–519; H01M 50/528–54; H01M 50/543–553; H01M 10/00–0587; H01M 10/24–32; H01M 10/36–38; H01M 10/42; H01M 10/425; H01M 10/54–667

See application file for complete search history.

(56) References Cited

U.S. PATENT DOCUMENTS

| | | | |
|---|---|---|---|
| 8,889,289 B2 | 11/2014 | Meehan et al. | |
| 2002/0061438 A1* | 5/2002 | Inoue | H01M 10/0431 429/211 |
| 2007/0026306 A1* | 2/2007 | Lee | H01M 50/502 429/178 |
| 2010/0216007 A1* | 8/2010 | Kane | H01M 10/6556 429/153 |
| 2010/0281681 A1* | 11/2010 | Rourke | H01M 10/0413 29/623.1 |
| 2010/0304195 A1* | 12/2010 | Meehan | H01M 50/20 429/65 |

(Continued)

*Primary Examiner* — Jonathan Crepeau
*Assistant Examiner* — Jacob Buchanan
(74) *Attorney, Agent, or Firm* — Quinn IP Law

(57) ABSTRACT

A tooling system is configured to align and assemble a battery module having a plurality of battery cells arranged in a stack. Each battery cell has a flexible electrical terminal arranged along a respective terminal axis, and wherein the terminal axes are parallel to one another. The system includes a tooling fixture defining at least one Y-shape slit having a V-collector culminating in a slot arranged along a slot axis. Each V-collector is configured to capture the terminals of at least two battery cells. Each slot is configured to group the captured terminals when the slot axis is parallel to the terminal axes and the fixture engages the battery module. The system also includes a mechanism configured to apply a first force to the fixture along the slot axis to engage the battery module with the fixture. The mechanism thereby groups and aligns the captured terminals within the slot.

13 Claims, 5 Drawing Sheets

(56) References Cited

U.S. PATENT DOCUMENTS

| | | | | |
|---|---|---|---|---|
| 2016/0149256 | A1* | 5/2016 | Leroux | H01M 10/0468 429/153 |
| 2018/0226653 | A1* | 8/2018 | Yamamoto | H01M 50/54 |
| 2019/0321945 | A1* | 10/2019 | Jung | B23K 37/0443 |
| 2020/0368855 | A1* | 11/2020 | Kim | H01M 50/50 |
| 2021/0344083 | A1* | 11/2021 | Kim | H01M 50/553 |

* cited by examiner

TOOLING AND METHOD FOR ALIGNMENT AND ASSEMBLY OF BATTERY MODULE

INTRODUCTION

The present disclosure relates to tooling and a method for alignment and assembly of a battery module.

A battery system or array may include a plurality of battery cells in relatively close proximity to one another. Batteries may be broadly classified into primary and secondary batteries. Primary batteries, also referred to as disposable batteries, are intended to be used until depleted, after which they are simply replaced with new batteries. Secondary batteries, more commonly referred to as rechargeable batteries, employ specific chemistries permitting such batteries to be repeatedly recharged and reused, therefore offering economic, environmental and ease-of-use benefits compared to disposable batteries. Rechargeable batteries may be used to power such diverse items as toys, consumer electronics, and motor vehicles. Rechargeable batteries may be arranged in packs or modules and packaged in specifically designed enclosures. Special tools may be employed to facilitate assembly of battery modules.

SUMMARY

A tooling system is configured to align and assemble a battery module having a plurality of battery cells arranged in a battery stack. Each battery cell has a respective flexible electrical terminal arranged along a respective terminal axis, and wherein each terminal axis is parallel to another terminal axis. The tooling system includes a tooling fixture, such as an alignment member, defining at least one Y-shape slit having a V-collector culminating in a slot arranged along a slot axis. Each Y-shape slit is configured to initially capture the flexible electrical terminals of at least two of the plurality of battery cells in the respective V-collector. Each Y-shape slit is then configured to group the captured flexible electrical terminals by the respective slot when the tooling fixture is positioned such that the slot axis is parallel to the terminal axes and the tooling fixture engages the battery module. The tooling system also includes a mechanism configured to apply a first force to the tooling fixture along the slot axis to engage the battery module with the tooling fixture. The mechanism thereby groups and aligns the captured flexible electrical terminals within the slot.

The tooling fixture may be configured as a one-piece plate arranged perpendicular to the slot axis, such that the one-piece plate includes a plurality of the Y-shape slits.

The battery module additionally may include a plurality of expansion pads, such that one of the expansion pads is arranged between two adjacent battery cells. The tooling system may further include a press configured to impart a second force to the battery stack in a direction perpendicular to the terminal axes and thereby compress the plurality of expansion pads.

The tooling fixture may be configured as a plurality of flexibly interconnected plate portions arranged in a column perpendicular to the slot axis. In such an embodiment, each plate portion may define one Y-shape slit.

The tooling fixture additionally may include a plurality of first resilient members. In such an embodiment, one of the first resilient members may be arranged between two adjacent plate portions, such that the first resilient members are compressed along with the plurality of expansion pads by the second force imparted by the press.

The tooling fixture may additionally include a guide rail configured to arrange and retain the plurality of plate portions in the column and facilitate movement of the plurality of plate portions along the guide rail perpendicular to the slot axis when the second force is imparted by the press.

Each plate portion may have a first sub-portion and a second sub-portion. The first sub-portion and the second sub-portion may together define one Y-shape slit. In such an embodiment, the tooling fixture may additionally include a plurality of second resilient members. One of the second resilient members may be arranged between the first and second sub-portions, such that the second resilient members are compressed along with the plurality of expansion pads and the plurality of the first resilient members by the second force imparted by the press.

The tooling system may additionally include a pressure plate fixed to the tooling fixture and having a reaction surface configured to transmit the force from the mechanism to the tooling.

At least one Y-shape slit may be configured to capture the flexible electrical terminals of three of the plurality of battery cells in the V-collector.

The mechanism may include one of an air and a hydraulic pressure cylinder configured to apply the first force.

A method of aligning and assembling a battery module is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
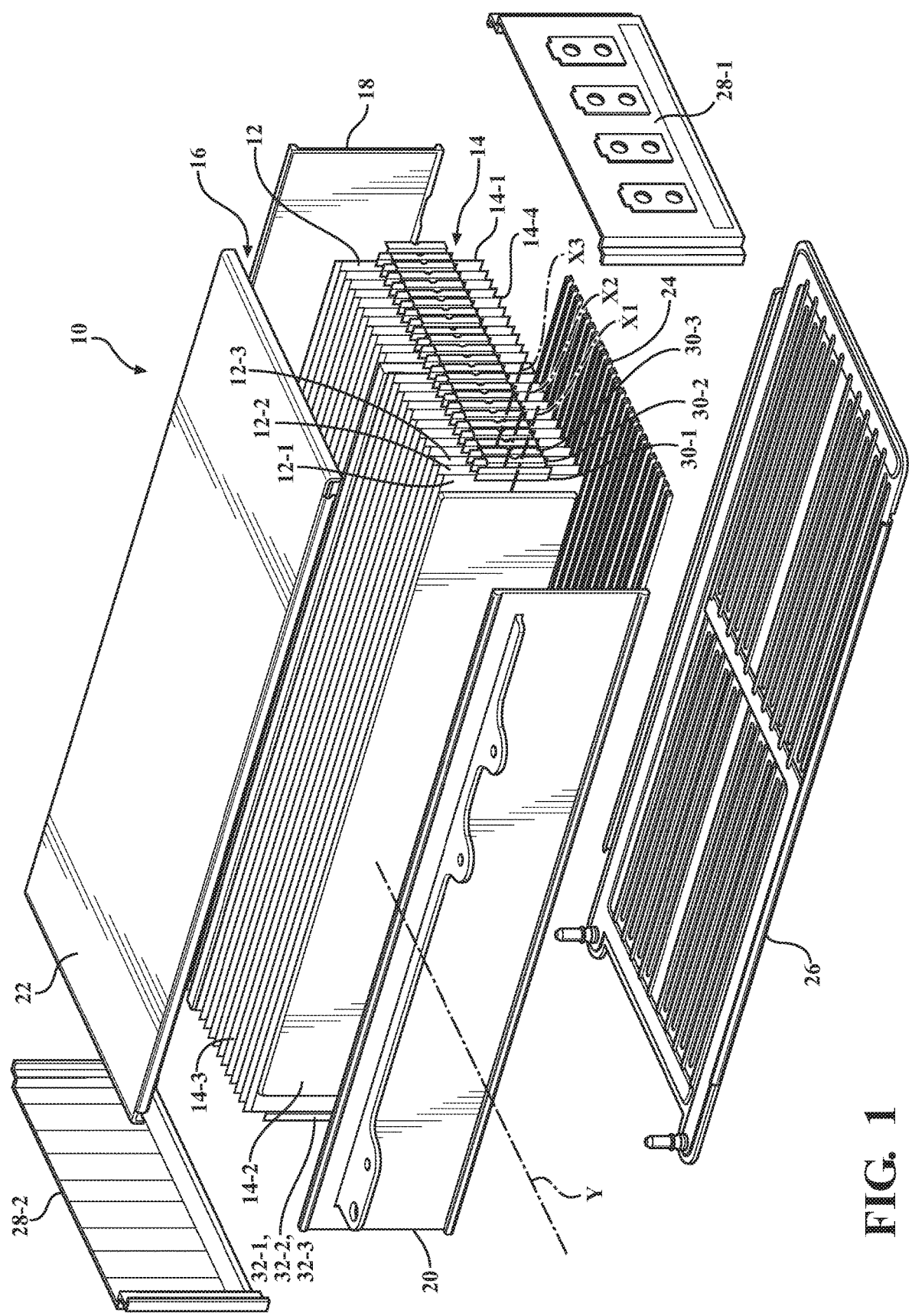
FIG. 1 is a schematic top perspective exploded view of a battery module having a battery module housing and a stack of battery cells with grouped and aligned electrical terminals, according to the disclosure.

Referring to FIG. 1, an exploded view of a battery module or pack 10 is depicted. As shown, the battery module 10 includes a plurality of battery cells 12 arranged in a battery stack 14. Each battery cell 12 in the battery module 10 generates and stores electrical energy through heat-producing electro-chemical reactions. The battery module 10 may, for example, be employed in a motor vehicle (not shown) having a powertrain for propulsion thereof and using one or more power-sources. The battery module 10 may be configured to generate and store electrical energy for operating the vehicle power-sources. An assembled battery module 10 includes an enclosure or a housing 16. FIG. 1 depicts the battery module 10 in an exploded state to illustrate arrangement of the battery stack 14 within the housing 16.

With continued reference to FIG. 1, the battery stack 14 has a first side surface 14-1, a second side surface 14-2, a top surface 14-3, and a bottom surface 14-4. The housing 16 is configured to maintain arrangement of the battery cells 12 in the battery stack 14, protect the cells from damage, and facilitate mounting of the module 10 in its operative environment (such as a motor vehicle discussed above). The housing 16 includes a first side plate 18, a second side plate 20, and a cover or top plate 22 attached to the first and second side plates. The first side plate 18, the second side plate 20, and the cover 22 are configured to bound the battery stack 14 on the respective first side surface 14-1, second side surface 14-2, and top surface 14-3.

As additionally shown in FIG. 1, an epoxy layer 24 may be applied to the bottom surface 14-4 of the battery stack 14. The battery module 10 also includes a cooling plate 26 configured to manage heat transfer from the battery stack 14 to the environment. The cooling plate 26 is attached to the first and second side plates 18, 20 to thereby bound the battery stack 14 on the bottom surface 14-4. The cooling plate 26 may be additionally affixed to the bottom surface 14-4 of the battery stack 14 via the epoxy layer 24. The battery module housing 16 also includes first and second inter-connect boards (ICBs) 28-1, 28-2. The ICBs 28-1, 28-2 may be attached to, such as pre-assembled with, the cover 22 (shown in FIG. 3). Accordingly, the first and second side plates 18, 20, the cover 22, the cooling plate 26, and ICBs 28-1, 28-2 form the battery module enclosure 16.

Figure 2:
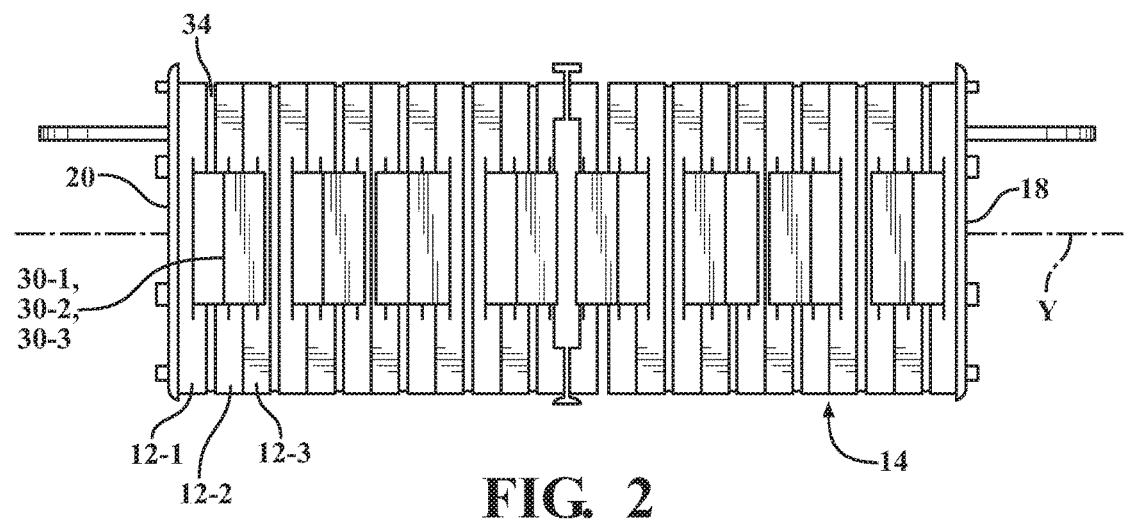
FIG. 2 is a schematic front view of the battery stack shown in FIG. 1.

As shown in FIGS. 1 and 2, the battery stack 14 is arranged along axis Y. Each battery cell 12 in the battery stack 14 has a flexible electrical terminal arranged along a respective terminal axis, such that each terminal axis is parallel to another terminal axis. Specifically illustrated in FIG. 1 for exemplary purpose is a first battery cell 12-1 having a first flexible electrical terminal or contact tab 30-1 arranged along a first axis X1, a second battery cell 12-2 having a second flexible electrical terminal 30-2 arranged along a second axis X2, and a third battery cell 12-3 having a third flexible electrical terminal 30-3 arranged along a third axis X3; all arranged proximate the first ICB 28-1, i.e., on the front side of the battery stack 14. The first, second, and third terminals 30-1, 30-2, 30-3, may, for example, be positive terminals grouped together for engagement with the first ICB 28-1. The first, second, and third axes X1, X2, X3 are parallel to each other. As shown in FIG. 1, the first battery cell 12-1 also has another terminal 32-1 arranged along the first axis X1, the second battery cell 12-2 has another terminal 32-2 arranged along the second axis X2, and the third battery cell 12-3 has another electrical terminal 32-3 arranged along the third axis X3; all arranged proximate the second ICB 28-2, i.e., on the opposite side of the battery stack 14.

If the first, second, and third terminals 30-1, 30-2, 30-3 are positive, the battery terminals 32-1, 32-2, 32-3 would be negative terminals grouped together for engagement with the second ICB 28-2. Alternatively, depending on the specific embodiment and layout of the battery module 10, the first terminal 30-1 of the first battery cell 12-1 may be grouped with the second terminal 30-2 of the second battery cell 12-2, but not with the third terminal 30-3 (the third terminal would then be grouped with the another adjacent terminal). In such an embodiment, the terminals 32-1 and 32-2 may be similarly grouped, but not with the terminal 32-3, on the opposite side of the battery stack 14. The battery module 10 may additionally include a plurality of expansion pads 34 (shown in FIGS. 2 and 5). One individual expansion pad 34 may be interposed between each two adjacent battery cells, such as between the first battery cell 12-1 and the second battery cell 12-2, as well as between the second battery cell 12-2 and the third battery cell 12-3.

Figure 3:
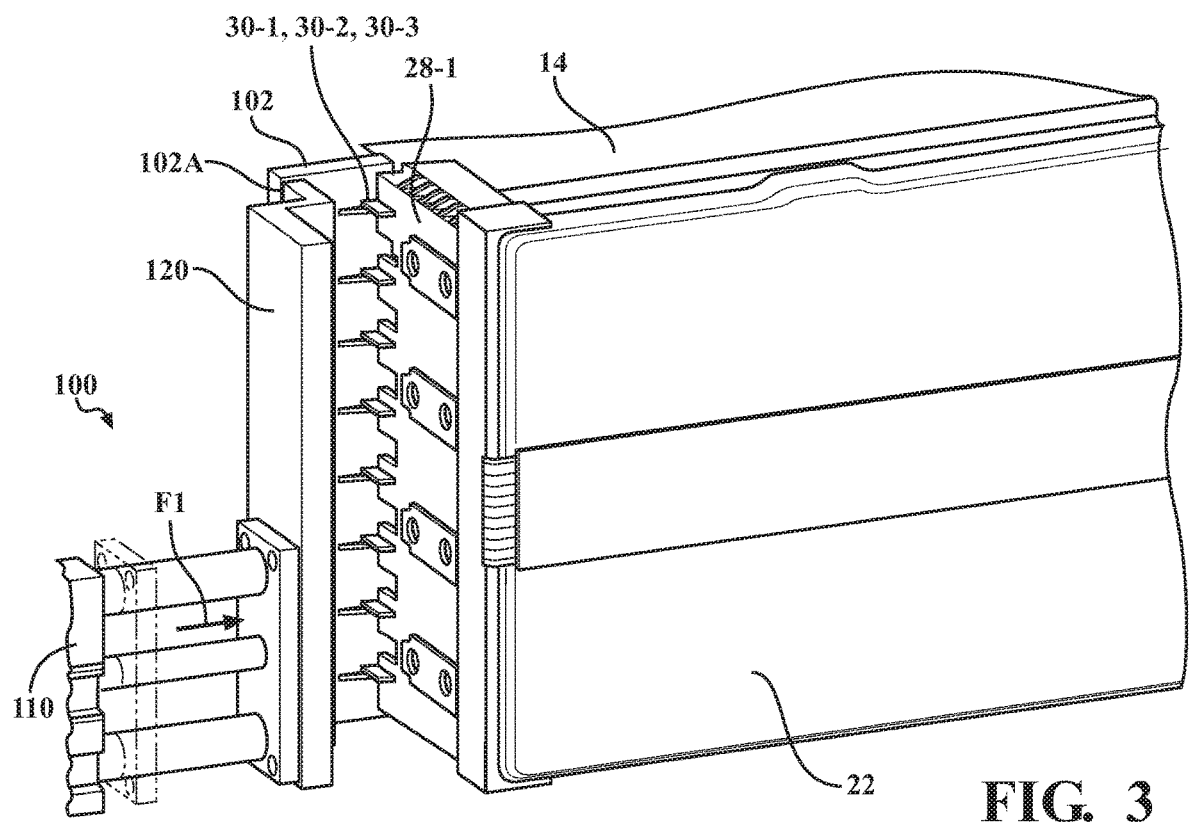
FIG. 3 is a schematic perspective view of a tooling system used in assembling the battery stack, including a tooling fixture or alignment member, according to the disclosure.

A tooling system 100 is shown in FIG. 3. The tooling system 100 is specifically configured to facilitate assembling the battery stack 14 on the front side with the first ICB 28-1 (and separately, on the opposite side, with the second ICB 28-2). The tooling system 100 includes a tooling fixture or alignment member 102. The tooling fixture 102 is configured to engage the battery stack 14, and group and align battery terminals of at least two of the adjacent battery cells, such as 12-1, 12-2, and 12-3 (shown in FIG. 4). The tooling fixture 102 defines Y-shape slits 104 having a V-collector 106 culminating in a substantially straight slot 108 arranged along a slot axis $X_T$. Each Y-shape slit 104 is configured to initially capture the respective flexible electrical terminals of at least two of the plurality of adjacent battery cells in the V-collector 106.

Figure 4:
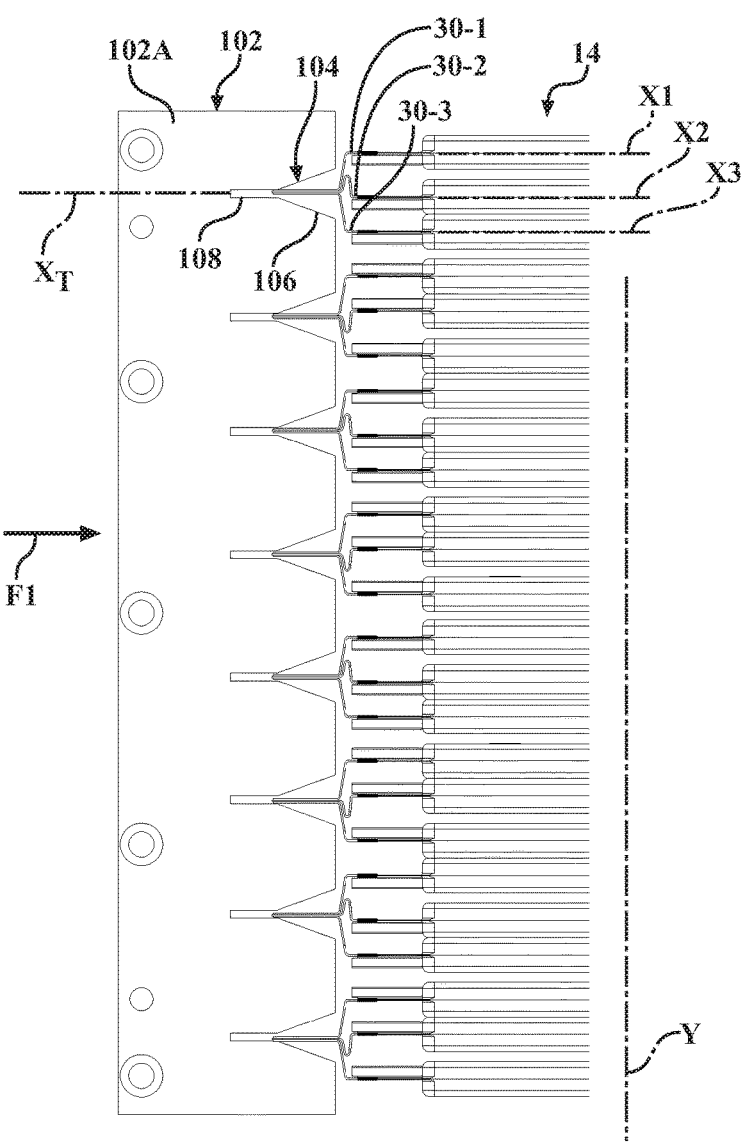
FIG. 4 is a schematic side view of an embodiment of the tooling fixture shown in FIG. 3, according to the disclosure.

Specifically, in the embodiment of the battery stack 14 shown in FIG. 4, one Y-shape slit 104 may be configured to capture the first, second, and third terminals 30-1, 30-2, 30-3. The battery terminals 32-1, 32-2, 32-3 may be similarly captured, such as with another duplicate tooling fixture, or subsequently with the tooling fixture 102. Specifically, in the embodiment of the battery stack 14 shown in FIG. 2, one Y-shape slit 104 may be configured to capture the first, second, and third terminals 30-1, 30-2, 30-3. For an alternative embodiment of the battery module 10, the tooling fixture 102 may be configured such that each Y-shape slit 104 captures only two adjacent terminals of the battery stack 14 (not shown).

Following the capture by the Y-shape slit 104, the tooling fixture 102 is configured to group the captured flexible electrical terminals, such as the first, second, and third terminals 30-1, 30-2, 30-3, by keying them into the slot 108. The grouping of the respective terminals 30-1, 30-2, 30-3 is to be accomplished with the tooling fixture 102 being positioned such that slot axis $X_T$ is generally aligned with and parallel to the terminal axes X1, X2, X3 and, in such orientation, the tooling fixture engaging the battery stack 14. The tooling fixture 102 may therefore need to come in square to the first, second, and third terminals 30-1, 30-2, 30-3, i.e., perpendicular to the axis Y. Although the above and below description focuses on aligning and grouping the first, second, and third terminals 30-1, 30-2, 30-3 on the front side of the battery stack 14, analogous procedure would take place with respect to aligning and grouping of the terminals 32-1, 32-2, and 32-3 on the opposite side of the stack.

Figure 5:
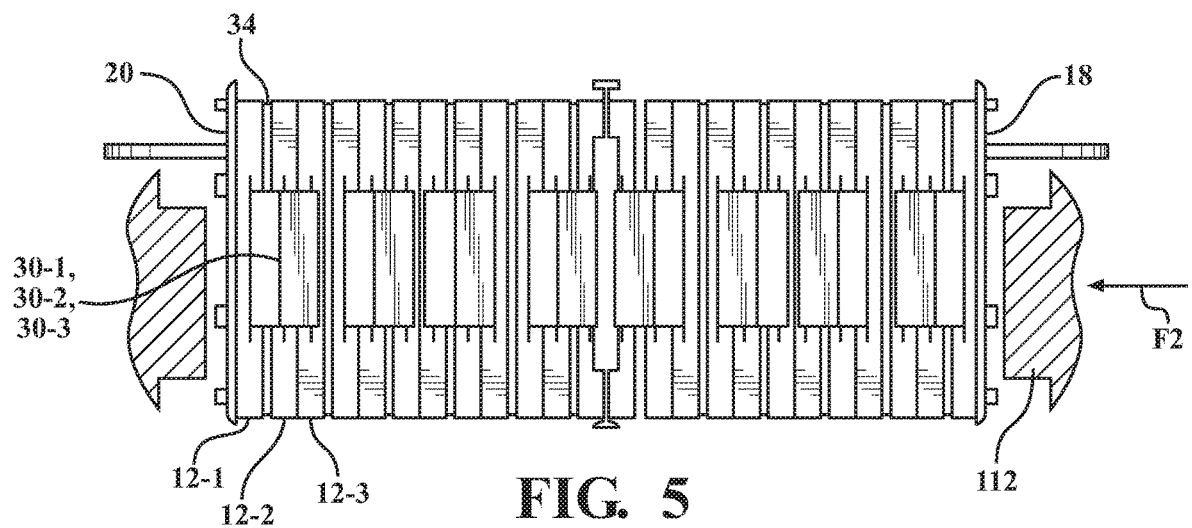
FIG. 5 is a schematic illustration of a press configured to impart a compressive force to the battery stack shown in FIG. 2, according to the disclosure.

As shown in FIG. 3, the tooling system 100 also includes a mechanism 110. The mechanism 110 is configured to apply a first force F1 to the tooling fixture 102 along the slot axis $X_T$ to engage the battery stack 14 with the tooling fixture and thereby group and align the captured flexible electrical terminals, such as the first, second, and third terminals 30-1, 30-2, 30-3 within the slot 108. Thus grouped and aligned, the respective flexible electrical terminals facilitate decking of the first ICB 28-1 on the front side (and the second ICB 28-2 on the opposite side) of the battery module 10. The mechanism 110 may be either an air or a hydraulic pressure cylinder configured to apply the first force F1. As shown in FIG. 5, the tooling system 100 may additionally include a press 112 configured to impart a second force F2 to the battery stack 14 in a direction perpendicular to the terminal axes X1, X2, X3, and thereby squeeze the stack via compressing the plurality of expansion pads 34. Such compression of the expansion pads 34 is intended to facilitate a compact arrangement of the battery stack 14 and a snug fit thereof inside the housing 16 for generation of the module 10.

In a baseline embodiment, shown in FIG. 4, the tooling fixture 102 may be configured as a continuous, i.e., one-piece, plate 102A arranged perpendicular to the slot axis $X_T$ defining the plurality of the Y-shape slits 104. In another embodiment, shown in FIG. 6, the tooling fixture 102 may be configured as a plurality of flexibly interconnected plate portions 102B arranged in a column 102C perpendicular to the slot axis $X_T$. Each plate portion 102B is configured to define one Y-shape slit 104. The embodiment of the tooling fixture 102 shown in FIG. 6, may additionally include a plurality of first resilient members 114.

Figure 6:
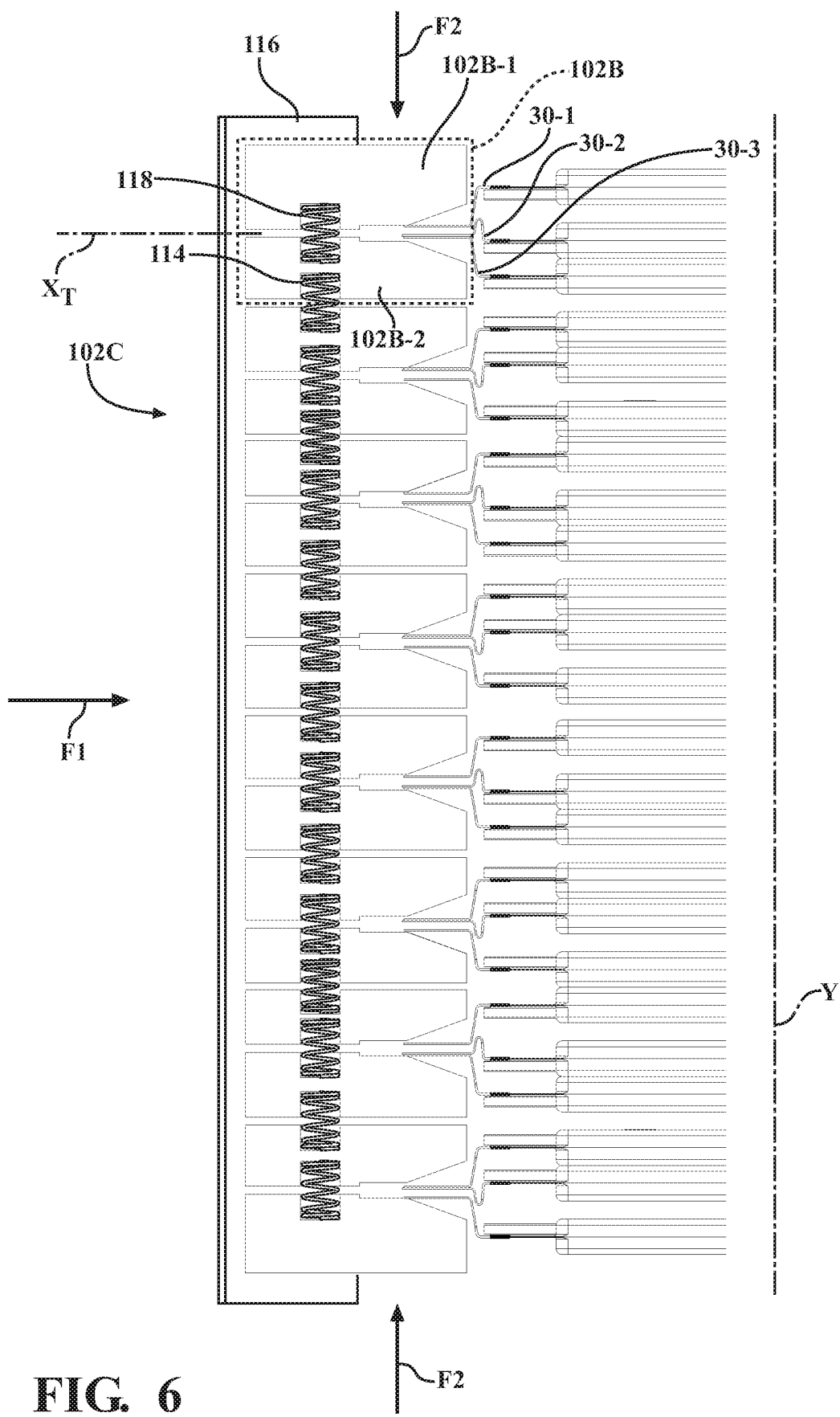
FIG. 6 is a schematic side view of another embodiment of the tooling fixture shown in FIG. 3, according to the disclosure.

Specifically, a particular first resilient member 114 may be arranged between each two adjacent plate portions 102B. In such a construction of the tooling fixture 102, the plurality of first resilient members 114 is intended to be compressed by the second force F2 imparted by the press 112, along with the plurality of expansion pads 34. For example, as shown, each first resilient member 114 may be configured as a coil spring. As shown in FIG. 6, the tooling fixture 102 may also include a guide rail 116. In the subject embodiment the guide rail 116 is configured to arrange and retain the plurality of plate portions 102B in the column 102C. Additionally, the guide rail 116 is configured to facilitate movement of the subject plate portions 102B perpendicular to the slot axis $X_T$ and along the guide rail under the second force F2.

As shown in FIG. 6, each plate portion 102B may have a first sub-portion 102B-1 and a second sub-portion 102B-2. Together, the adjacent first sub-portion 102B-1 and the second sub-portion 102B-2 may define one Y-shape slit 104. The tooling fixture 104 may additionally include a plurality of second resilient members 118. In such an embodiment, one of the second resilient members 118 is arranged between the first and second sub-portions 102B-1, 102B-2. The second resilient members 118 are compressed by the second force F2 imparted by the press 112, along with the plurality of expansion pads 34 and the plurality of the first resilient members 114. As described above, application of the second force F2 is intended to compress the battery stack 14 to permit fitting of the stack into the housing 16 and formation of the module 10.

With resumed reference to FIG. 3, the tooling system 100 may additionally include a pressure plate 120 fixed to the tooling fixture 102 and having a reaction surface 120A configured to transmit the first force F1 from the mechanism 110 to the tooling fixture. In the embodiment of the tooling fixture 102 shown in FIG. 4, the pressure plate 120 may be configured to transmit the first force F1 specifically or directly to the continuous plate 102A, while in the embodiment of the tooling fixture shown in FIG. 6, the pressure plate may be configured to transmit the first force initially to the guide rail 116. Accordingly, the tooling system 100, as described above with respect to FIGS. 3-6, is specifically configured to facilitate assembling the battery stack 14 on the front side with the first ICB 28-1 (and separately, on the opposite side, with the second ICB 28-2). Such construction of the battery stack 14 prepares the battery stack for the final assembly of the battery module 10 within the enclosure 16.

Figure 7:
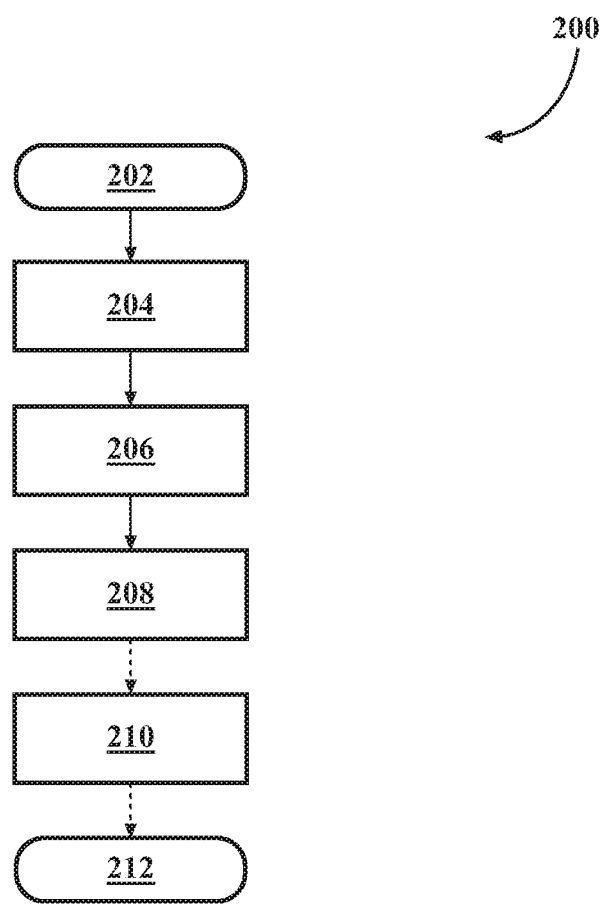
FIG. 7 is a flow diagram of a method of aligning and assembling a battery module shown in FIGS. 1-6, according to the present disclosure.

FIG. 7 depicts a method 200 of aligning and assembling a battery module, such as the battery module 10 described above with respect to FIGS. 1-6. The method 200 may be performed by specifically trained personnel in a manufacturing facility, and employ various machinery and equipment configured to automate the process of manufacturing such battery modules. The method 200 initiates in frame 202 with setting up battery cells, such as the cells 12-1, 12-2, and 12-3 having the first, second, and third terminals 30-1, 30-2, and 30-3, in the battery stack 14. Following frame 202, the method proceeds to frame 204.

In frame 204 the method includes applying, such as via the mechanism 110, the first force F1 to the tooling fixture 102 defining Y-shape slit(s) 104, each having the V-collector 106 culminating in the slot 108 arranged along the slot axis $X_T$, to engage the battery module 10 with the tooling fixture. As described above with respect to FIGS. 1-6, the first force F1 is applied when the tooling fixture 102 is positioned such that slot axis $X_T$ is parallel to the respective terminal axes, such as the first axis, second axis, and third axis X1, X2, X3, and the tooling fixture is square to the terminal. In frame 204 the method may also include imparting the second force F2 to the battery stack 14 via the press 112 in the direction perpendicular to the terminal axes, such as the first axis, second axis, and third axis X1, X2, X3, to thereby compress the expansion pads 34. The plurality of expansion pads 34 may be compressed along with the plurality of first resilient members 114 and the second resilient members 118 by the second force F2.

In frame 204 the method may additionally include moving the plurality of plate portions, such as the portions 102B, along the guide rail 116 perpendicular to the slot axis $X_T$ under the second force F2. The second force F2 may be applied prior to application of the first force F1. After frame 204 the method advances to frame 206. In frame 206 the method includes initially capturing at least two of the respective electrical terminals, such as the first, second, and third terminals 30-1, 30-2, 30-3 of the adjacent battery cells 12 in the V-collector 106 of each Y-shape slit 104. In other words, flexible electrical terminals of at least two of the battery cells will be captured in the V-collector 106 of one Y-shape slit 104. Following frame 206, the method moves on to frame 208. In frame 208, the method includes grouping and aligning the captured flexible electrical terminals, e.g., the first, second, and third terminals 30-1, 30-2, 30-3, within the respective slot 108. After grouping and aligning of the respective electrical terminals, the method may proceed to frame 210.

In frame 210 the method may include assembling or decking the first ICB 28-1 on the front side and the second ICB 28-2 on the opposite side of the battery stack 14. The ICB 28-1 and 28-2 may be respectively assembled with the stack 14 by being slid onto the grouped and aligned terminals 30-1, 30-2, 30-3 on the front side of the stack and onto the grouped and aligned terminals 32-1, 32-2, 32-3 on the opposite side of the stack. The tooling fixture 102 may remain in position having the Y-shape slits 104 engaged with the electrical terminals on the side of the stack 14 receiving the respective ICB. In frame 210 the method may also include attaching the first and second side plates 18, 20, the cover 22, and the cooling plate 26 of the enclosure 16 to the battery stack 14 to thereby generate the battery module 10. The method may conclude in frame 212 following the formation of the enclosure 16.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A tooling system for alignment and assembly of a battery module having:
    a plurality of battery cells arranged in a battery stack and having a plurality of expansion pads, such that one of the plurality of expansion pads is arranged between two adjacent battery cells, wherein each of the plurality of battery cells has a respective flexible electrical terminal arranged along a respective terminal axis, and wherein each terminal axis is parallel to another terminal axis; the tooling system comprising:
        a tooling fixture defining at least one Y-shape slit having a V-collector culminating in a slot arranged along a slot axis, wherein each Y-shape slit is configured to capture the respective flexible electrical terminals of at least two of the battery cells in the respective V-collector and group the captured flexible electrical terminals by the respective slot when the tooling fixture is positioned such that the slot axis is parallel to the terminal axes and the tooling fixture engages the battery module, wherein the tooling fixture is configured as a plurality of flexibly interconnected plate portions arranged in a column perpendicular to the slot axis, and wherein each plate portion defines one Y-shape slit; and
        a mechanism configured to apply a first force to the tooling fixture along the slot axis to engage the battery module with the tooling fixture and thereby group and align the captured flexible electrical terminals within the slot; and
        a press configured to impart a second force to the battery stack in a direction perpendicular to the terminal axes and thereby compress the plurality of expansion pads.

2. The tooling system of claim 1, wherein the tooling fixture additionally includes a plurality of first resilient members, and wherein one of the plurality of first resilient members is arranged between two adjacent plate portions, such that the plurality of first resilient members is compressed by the second force along with the plurality of expansion pads.

3. The tooling system of claim 2, wherein the tooling fixture additionally includes a guide rail configured to arrange and retain the plurality of plate portions in the column and facilitate movement of the plurality of plate portions along the guide rail perpendicular to the slot axis.

4. The tooling system of claim 2, wherein:
    each of the plate portions has a first sub-portion and a second sub-portion, wherein the first sub-portion and the second sub-portion together define one Y-shape slit;
    the tooling fixture additionally includes a plurality of second resilient members; and
    one of the plurality of second resilient members is arranged between the first and second sub-portions, such that the plurality of second resilient members is compressed by the second force along with the plurality of expansion pads and the plurality of the first resilient members.

5. The tooling system of claim 1, further comprising a pressure plate fixed to the tooling fixture and having a reaction surface configured to transmit the force from the mechanism to the tooling fixture.

6. The tooling system of claim 1, wherein the at least one Y-shape slit is configured to capture the flexible electrical terminals of three of the plurality of battery cells in the V-collector.

7. The tooling system of claim 1, wherein the mechanism includes one of an air and a hydraulic pressure cylinder configured to apply the first force.

8. A method of aligning and assembling a battery module having a plurality of battery cells arranged in a battery stack and a plurality of expansion pads, such that one of the plurality of expansion pads is arranged between two adjacent battery cells of the plurality of battery cells, wherein each of the plurality of battery cells has a respective flexible electrical terminal arranged along a respective terminal axis, and wherein each terminal axis is parallel to another terminal axis, the method comprising:
    applying a first force to a tooling fixture defining at least one Y-shape slit having a V-collector culminating in a slot arranged along a slot axis to engage the battery module with the tooling fixture, when the tooling fixture is positioned such that the slot axis is parallel to the terminal axes, wherein the tooling fixture is configured as a plurality of flexibly interconnected plate portions arranged in a column perpendicular to the slot axis, such that each of the plate portions defines one Y-shape slit, and includes a plurality of first resilient members, and wherein one of the plurality of first resilient members is arranged between two adjacent plate portions;
    capturing the respective flexible electrical terminals of at least two of the battery cells in the V-collector of one Y-shape slit;
    grouping and aligning the captured flexible electrical terminals within the respective slot imparting a second force to the battery stack via a press in a direction perpendicular to the terminal axes and thereby compressing the plurality of expansion pads; and
    compressing the plurality of first resilient members by the second force along with the plurality of expansion pads.

9. The method of claim 8, wherein the tooling fixture additionally includes a guide rail configured to arrange and retain the plurality of plate portions in the column, wherein the method includes moving the plurality of plate portions along the guide rail perpendicular to the slot axis.

10. The method of claim 8, wherein:
    each of the plate portions has a first sub-portion and a second sub-portion, wherein the first sub-portion and the second sub-portion together define one Y-shape slit;
    the tooling fixture additionally includes a plurality of second resilient members;
    one of the plurality of second resilient members is arranged between the first and second sub-portions; and
    the method further comprising compressing the plurality of second resilient members by the second force along with the plurality of expansion pads and the plurality of the first resilient members.

11. A tooling fixture for a battery module having a stack of battery cells and a plurality of expansion pads, such that one of the plurality of expansion pads is arranged between two adjacent battery cells, with each battery cell having a respective flexible electrical terminal arranged along a respective terminal axis, and each terminal axis being parallel to another terminal axis, the tooling fixture comprising:
    an alignment member defining a plurality of the Y-shape slits, wherein:
        each of the plurality of Y-shape slits has a V-collector culminating in a slot arranged along a slot axis; and
        each of the plurality of Y-shape slits is configured to capture the respective flexible electrical terminals of at least two of the battery cells in the respective V-collector and group the captured flexible electrical terminals by the respective slot when the alignment member is positioned such that the slot axis is parallel to the terminal axes and the tooling fixture engages the battery module;
    wherein:
        the alignment member is configured as a plurality of flexibly interconnected plate portions arranged in a column perpendicular to the slot axis, and wherein each plate portion defines one Y-shape slit;
        the alignment member additionally includes a plurality of first resilient members; and
        one of the plurality of first resilient members is arranged between two adjacent plate portions, such that the plurality of first resilient members is compressed by a second force along with the plurality of expansion pads.

12. The tooling fixture of claim 11, wherein the alignment member additionally includes a guide rail configured to arrange and retain the plurality of plate portions in the column and facilitate movement of the plurality of plate portions along the guide rail perpendicular to the slot axis.

13. The tooling fixture of claim 12, wherein:
    each plate portion has a first sub-portion and a second sub-portion, wherein the first sub-portion and the second sub-portion together define one Y-shape slit;
    the alignment member additionally includes a plurality of second resilient members; and one of the plurality of second resilient members is arranged between the first and second sub-portions, such that the plurality of second resilient members is compressed by the second force along with the plurality of expansion pads and the plurality of the first resilient members.

* * * * *